US011962485B2

(12) United States Patent
Maric et al.

(10) Patent No.: US 11,962,485 B2
(45) Date of Patent: Apr. 16, 2024

(54) SELECTING AND DEDUPLICATING FORWARDING EQUIVALENCE CLASSES

(71) Applicant: Arista Networks, Inc., Santa Clara, CA (US)

(72) Inventors: Emil Maric, Port Coquitlam (CA); Mayukh Saubhasik, Richmond (CA); Vahab Akbarzadeh, Burnaby (CA); Trevor Siemens, Coquitlam (CA)

(73) Assignee: ARISTA NETWORKS, INC., Santa Clara, CA (US)

(\*) Notice: Subject to any disclaimer, the term of this patent is extended or adjusted under 35 U.S.C. 154(b) by 0 days.

(21) Appl. No.: 18/159,623

(22) Filed: Jan. 25, 2023

(65) Prior Publication Data

US 2023/0246940 A1    Aug. 3, 2023

Related U.S. Application Data

(63) Continuation of application No. 17/388,415, filed on Jul. 29, 2021, now Pat. No. 11,570,083.

(60) Provisional application No. 63/142,775, filed on Jan. 28, 2021.

(51) Int. Cl.
*H04L 45/02* (2022.01)
(52) U.S. Cl.
CPC .................... *H04L 45/02* (2013.01)
(58) Field of Classification Search
CPC ............... H04L 45/02; G06F 15/173
USPC .......................... 709/241; 370/389
See application file for complete search history.

(56) References Cited

U.S. PATENT DOCUMENTS

| 7,277,434 | B2* | 10/2007 | Astarabadi | ........ H04M 15/8292 455/445 |
| 8,495,245 | B2* | 7/2013 | Busschbach | ........... H04L 69/08 709/200 |
| 10,270,687 | B2* | 4/2019 | Mithyantha | ............. H04L 45/46 |
| 2003/0193944 | A1* | 10/2003 | Sasagawa | ............... H04L 45/50 370/428 |
| 2004/0177157 | A1* | 9/2004 | Mistry | ................ H04L 12/4641 709/241 |
| 2014/0317259 | A1* | 10/2014 | Previdi | .................. H04L 61/30 709/223 |
| 2015/0312133 | A1* | 10/2015 | Rao | ........................ H04L 45/04 370/401 |

(Continued)

*Primary Examiner* — Anthony Mejia
(74) *Attorney, Agent, or Firm* — Fountainhead Law Group P.C.

(57) ABSTRACT

Techniques for operating a network device for sharing resources in a hardware forwarding table. In some embodiments, the network device may generate groups of routes having a common set of next hops; for each group of routes of the generated groups: collect resilient adjacencies associated with routes in the group; assemble pairs of the collected resilient adjacencies; and determine a number of differences between resilient adjacencies in each of the assembled pairs. The network device may further order the assembled pairs based on the number of differences, identify a pair of resilient adjacencies associated with a lowest number of differences; select a resilient adjacency of the identified pair of resilient adjacencies; program one or more routes associated with the selected resilient adjacency, to refer to the other resilient adjacency of the identified pair of resilient adjacencies; and remove an entry associated with the selected resilient adjacency from a forwarding table.

20 Claims, 10 Drawing Sheets

(56) References Cited

U.S. PATENT DOCUMENTS

2021/0075725 A1* 3/2021 Sellappa ............... H04L 45/745
2022/0239582 A1 7/2022 Maric et al.

* cited by examiner

Resilient Adjacency J (id: 1, address family: IPv4)
Resilient Adjacency K (id: 2, address family: IPv4)
Resilient Adjacency L (id: 3, address family: IPv4)
Resilient Adjacency M (id: 4, address family: IPv4)

620

Resilient Adjacency N (id: 1, address family: IPv4)
Resilient Adjacency O (id: 2, address family: IPv4)
Resilient Adjacency P (id: 1 address family: IPv6)
Resilient Adjacency Q (id: 3, address family: IPv6)

630

Resilient Adjacency R (id: 1, address family: IPv4)
Resilient Adjacency S (id: 2, address family: IPv4)
Resilient Adjacency T (id: 1 address family: IPv6)
Resilient Adjacency U (id: 2, address family: IPv6)

SELECTING AND DEDUPLICATING FORWARDING EQUIVALENCE CLASSES

CROSS-REFERENCE TO RELATED APPLICATIONS

This application is a continuation application and, pursuant to 35 U.S.C. § 120, is entitled to and claims the benefit of earlier filed application U.S. application Ser. No. 17/388,415 filed Jul. 29, 2021, which in turn is entitled to and claims the benefit of the filing date of U.S. Provisional Application No. 63/142,775, filed Jan. 28, 2021, the contents of both of which are incorporated herein by reference in their entireties for all purposes.

BACKGROUND

Packet forwarding in a network device involves the determination of a next hop device for a received data packet. The network device transmits the data packet to the next hop device and the next hop device forwards the packet on to its destination in the network. Packet forwarding uses dynamically obtained forwarding information to prepare the received packet for transmission to the next hop device. These updates are received in the control plane of the switch and maintained in a forwarding table also in the control plane. A program running in the control plane—using the forwarding table in the control plane—updates a forwarding table, which is sometimes referred to as the forwarding information base (FIB), that is maintained in the data plane.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Overview

The present disclosure describes systems and techniques for operating a network device (e.g., switch, router, and the like) to conserve resources in a hardware forwarding table. The number of routes that can be programmed into the hardware forwarding table of a network device (e.g., a packet processor in a switch) is finite. When the maximum capacity is reached, new routes cannot be added without deleting existing table entries.

Each route, for example, may point to a forwarding equivalence class (FEC) object in the hardware forwarding table. One kind of route is a flow resilient equal-cost multi-path (FRECMP) route. Other types of routes may be used. The FEC object may contain forwarding information for the route, such as next hop, outgoing interface, and forwarding treatment. To conserve space in the hardware forwarding table, routes can share FEC objects. For example, routes may share a FEC object when the routes have the same next hops in the same order. FEC object savings from this may be limited though, because several routes may have the same set of next hops but the next hop order is different. In this case, multiple different FEC objects would still be used.

Embodiments of the present disclosure may increase opportunities for FEC object sharing. FEC objects having the same set of next hop routes but in a different order may be shared (deduplicated). For example, two routes have the same set of next hops, but their respective hardware FEC objects have the next hops in a different order. Here, these two routes may share one FEC object by using one of the original FEC objects and discarding the other. The order of the next hops for one of the routes changes, though. Packets may be forwarded to a different next hop than they were before deduplication.

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

System Architecture

Figure 1A:
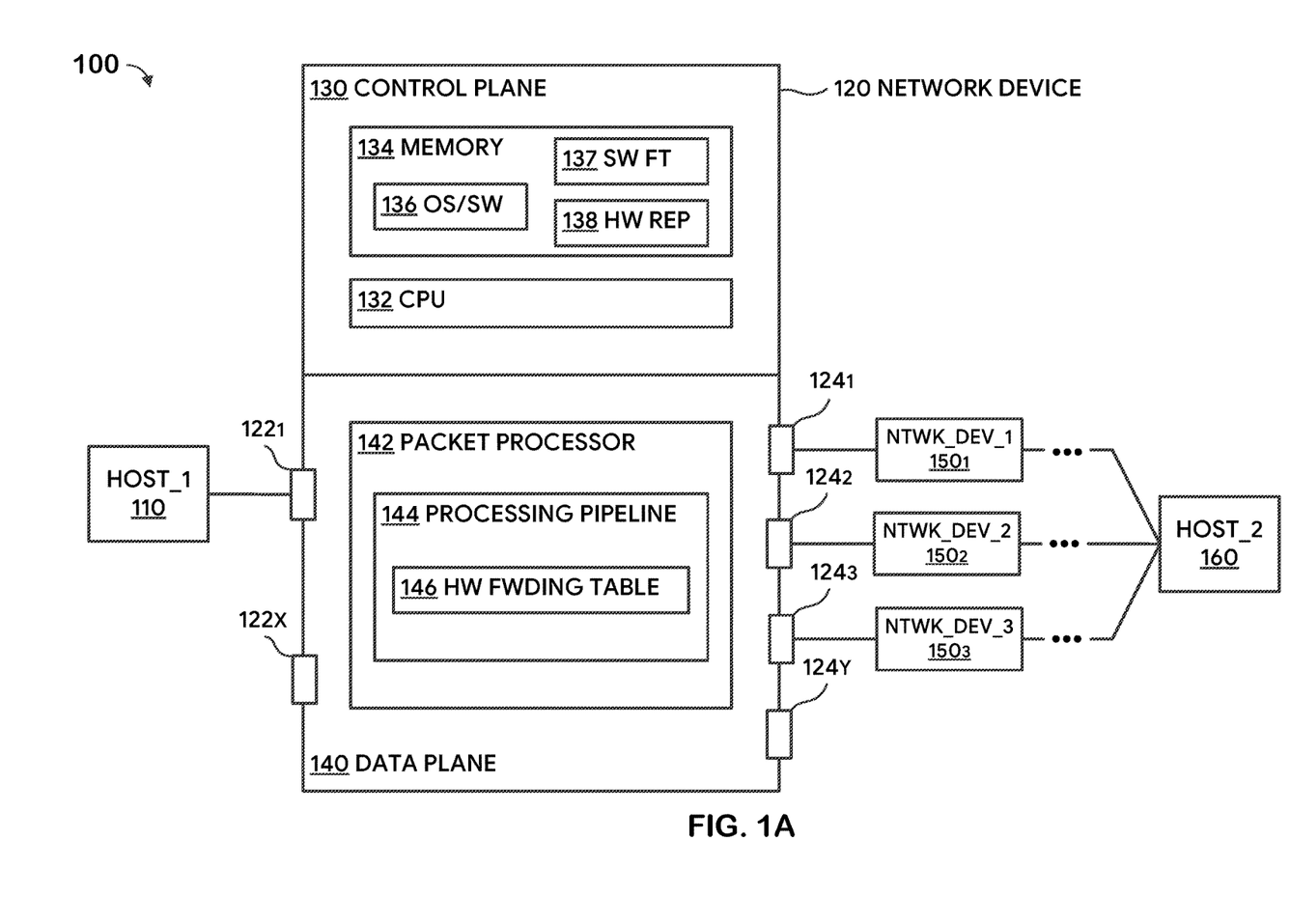
FIG. 1A illustrates a system architecture, in accordance with some embodiments of the disclosure.
Figure 7:
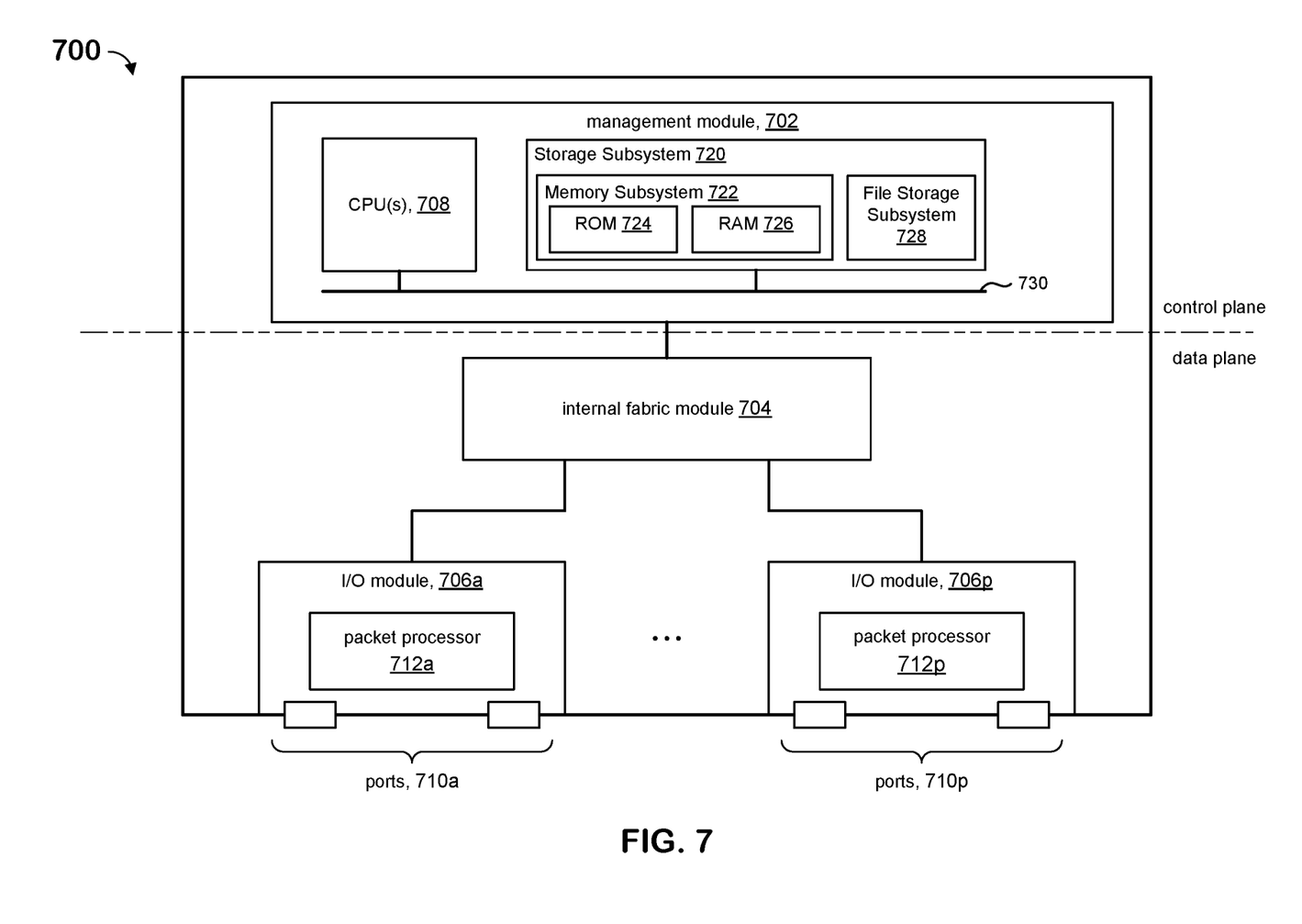
FIG. 7 illustrates a network device, in accordance with some embodiments of the disclosure.

FIG. 1A illustrates example system 100 in accordance with the present disclosure. System 100 may include host_1 110, network device 120, network_device_1 $150_1$ through network_device_3 $150_3$, and host_2 160. Host_1 110 and host_2 160 may be computing devices, such as servers, desktop computers, laptop computers, tablet computers, smartphones, and the like. Network device 120 and network_device_1 $150_1$ through network_device_3 $150_3$ may be embodiments of network device 700 (FIG. 7). Host_1 110 may communicate with network device 120 directly or through one or more intermediate network devices (not shown). Host_2 160 may communicate with network_device_1 $150_1$ through network_device_3 $150_3$ directly or through one or more intermediate network devices (not shown).

Network device 120—which may be a switch, router, and the like—includes control plane 130 and data plane 140 (sometimes referred to as a forwarding plane). Control plane 130 may exchange network topology information with other network devices and construct routing tables, such as software forwarding table 137, using a suitable routing protocol. Routing protocols may be a software mechanism by which network devices communicate and share information about the topology of the network, and the capabilities of each routing node. Routing protocols may include Enhanced Interior Gateway Routing Protocol (EIGRP), Routing Information Protocol (RIP), Open Shortest Path First (OSPF), Border Gateway Protocol (BGP), Label Distribution Protocol (LDP), and the like.

Software forwarding table 137 may be stored in memory 134. Memory 134 may be an embodiment of storage subsystem 720 (FIG. 7). Software forwarding table 137 may be a forwarding information base (FIB) (also referred to as an Internet Protocol (IP) forwarding table). For example, software forwarding table 137 may be a data structure which stores information that is used to determine where data packets traveling over an IP network will be directed. For example, software forwarding table 137 may include routine information for sending an incoming (ingress) IP data packet to the next hop on its route across the network as an outgoing (egress) IP data packet. A data packet may be a formatted unit of data carried by a data network. A data packet may include control information and user data (payload).

Control plane 130 may include central processing unit (CPU) 132. Among other processes, CPU 132 may run operating system and/or software 136, which is stored in memory 134. Operating system and/or software 136 may be at least one of an operating system and a computer program. Using the routing information stored in software forwarding table 137, operating system and/or software 136 may program forwarding tables in data plane 140, such as hardware forwarding table 146, using a software development kit (SDK), application programming interface (API), and the like.

On startup of network device 120 or when routing/topology changes occur in system 100, CPU 132 running operating system and/or software 136 may program/update software forwarding table 137 and hardware forwarding table 146. CPU 132 may maintain at least some of the information in hardware forwarding table 146 in hardware representation 138. Hardware forwarding table 146 may also be referred to as a hardware FIB or media access control address (MAC) table.

Data plane 140 may include ingress ports $122_1$-$122_X$, packet processor 142, and egress ports $124_1$-$124_Y$. Packet processor 142 may be an embodiment of packet processor 712a-712p. Packet processor 142 may include processing pipeline 144 and hardware forwarding table 146. Processing pipeline 144 may be a multi-stage pipeline to process data packets. Forwarding a data packet may involve looking at multiple header fields and each stage of processing pipeline 144 may be programmed to look at a different combination of header fields.

In operation, network device 120 may receive a data packet from host_1 110 through ingress port $122_1$ and the data packet may go to packet processor 142. In processing pipeline 144, the next hop for the data packet may be determined using hardware forwarding table 146.

Equal-cost multipath (ECMP) may be used for the route from host_1 110 to host_2 160. In ECMP, traffic of the same session or flow—in other words, traffic with the same source and destination—may be transmitted across multiple paths of equal cost. Paths of equal cost may be identified based on routing metric calculations and hash algorithms. In this way, traffic may be load balanced and bandwidth increased.

The ECMP process may identify a set of next hops for network device 120, such as network_device_1 $150_1$, network_device_2 $150_2$, and network_device_3 $150_3$, each of which is an equal-cost next hop towards the destination, host_2 160. An ECMP set of next hops may be determined, for example, from a static configuration and/or advertisements from a protocol such as Border Gateway Protocol (BGP). An ECMP set of next hops may be referred to as an adjacency. Because it may address just the next hop destination, ECMP can be used with different routing protocols. Although ECMP is described in the following illustrative examples, it will be appreciated that the present disclosure is not specific to ECMP routes and is applicable to other strategies.

Figure 1B:
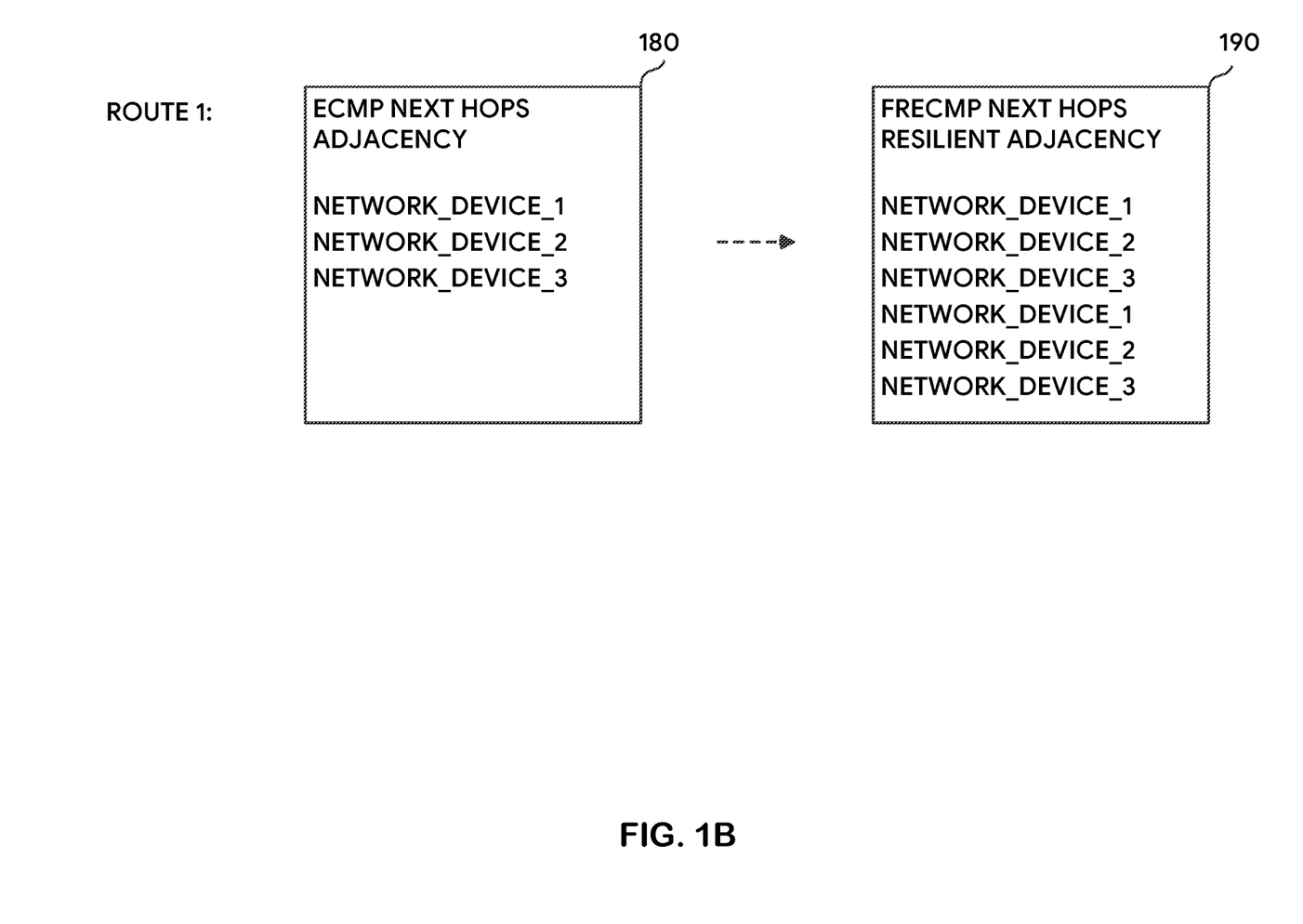
FIG. 1B illustrates ECMP and FRECMP routes, in accordance with some embodiments of the disclosure.

In FIG. 1B, set of ECMP next hops 180 for ROUTE 1 include network_device_1 ($150_1$), network_device_2 ($150_2$), and network_device_3 ($150_3$). In this example, (ECMP) ROUTE 1 is from host_1 110 to host_2 160. Although three next hops are illustrated, fewer or more next hops may be used.

Data traffic flow in system 100 may be disrupted (e.g., data packets are dropped or a next hop is not utilized) when a route undergoes churn, such as a next hop being added or deleted for the route when a network device goes active or inactive. A relatively long outage may occur as the network protocol recomputes the route. To minimize such disruptions, flow resilient equal-cost multi-path (FRECMP) may be used.

FRECMP is a way to equally distribute (spread out) a set of next hops for a route to minimize the amount of traffic flow disruptions. For each ECMP route, a fixed-size (predetermined-size) table may be allocated and the next hops hashed into the table slots. Data packets to be forwarded for this route may be hashed to one of these slots and forwarded to the next hop in the slot they were hashed to. The input to the hash for the data packet may typically be a part of the packet header, such as destination and source IP addresses.

Flow resilience may result from a small subset of the next hop entries in the table changing when a next hop gets added to or removed from an ECMP route. Thus, only a subset of the existing network flows going over the route may change. In ECMP hashing that is not resilient, the number of next hops and hence the hash modulo may change, affecting all network traffic flows going over the ECMP route. Although FRECMP is described in the following illustrative examples, it will be appreciated that the present disclosure is not specific to FRECMP routes and is applicable to other strategies.

FRECMP next hops 190 are a set of FRECMP next hops for ROUTE 1. The set of FRECMP next hops may be referred to as a resilient adjacency. By way of non-limiting example, FRECMP next hops 190 include: network_device_1 ($150_1$), network_device_2 ($150_2$), network_device_3 ($150_3$), network_device_1 ($150_1$), network_device_2 ($150_2$), and network_device_3 ($150_3$). As shown, network_device_1 ($150_1$), network_device_2 ($150_2$), and network_device_3 ($150_3$) for ROUTE 1 are distributed with a redundancy of 2 (e.g., each entry appears twice) in a table having six entries. Tables of different sizes, and different permutations or combinations of the next hops for a resilient adjacency may be used.

In control plane 130, CPU 132 running operating system and/or software 136 may derive FRECMP next hops 190 from ECMP next hops 180 and update them as ROUTE 1 undergoes churn. CPU 132 may maintain (a copy of) FRECMP next hops 190 in hardware representation 138. CPU 132 may also program/update hardware forwarding table 146 with FRECMP next hops 190. Each set of FRECMP next hops (resilient adjacency) may be stored in hardware forwarding table 146 as a Forward Equivalence Class (FEC) object. In addition to the resilient adjacency, a FEC object may also store forwarding information for the route, such as what egress links the next hop uses, next hop IP addresses, other identifying information for the next hops, and the like. Packet processor 142 may use FEC objects to make forwarding decisions for a packet that is meant for a certain route.

Hardware forwarding table 146 may have a finite capacity. Once hardware forwarding table 146 reaches its limit, FEC objects may not be added. To make optimal use of hardware forwarding table 146's capacity, FRECMP routes may share FEC objects in hardware forwarding table 146. In other words, more than one route may use the same FEC object (point to the same set of FRECMP next hops) in hardware forwarding table 146. By sharing FEC objects, an existing FEC object(s) may be removed, creating room in hardware forwarding table 146 to store a FEC object for another route.

Resource Sharing

Figure 2:
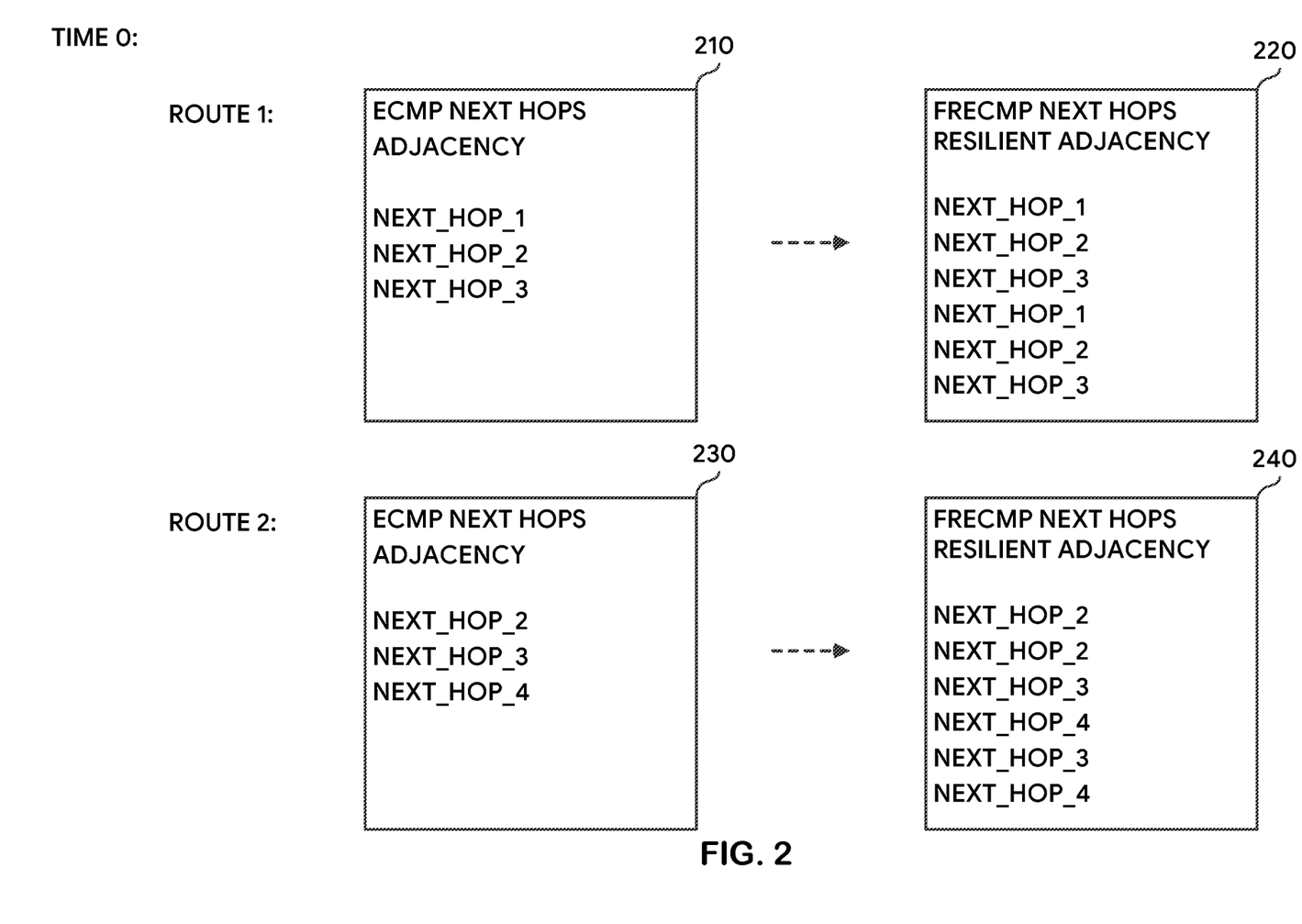
FIG. 2 illustrates route adjacencies and resilient adjacencies, in accordance with some embodiments of the disclosure.

FIG. 2 illustrates two routes, ROUTE 1 and ROUTE 2 at time 0, according to some embodiments. Adjacency 210 for ROUTE 1 and adjacency 230 for ROUTE 2 may have different sets of next hops. For example, adjacency 210 for ROUTE 1 has NEXT_HOP_1, NEXT_HOP_2, and NEXT_HOP_3. In contrast, adjacency 230 for ROUTE 2 has NEXT_HOP_2, NEXT_HOP_3, and NEXT_HOP_4. Accordingly, resilient adjacency 220 and resilient adjacency 240 may have different sets of next hops.

Sometimes routes having different sets of next hops may not be candidates for FEC object sharing, because different sets of next hops are not the same equal-cost multi-path route. Converging one of the FECs into another may require removing some of the next hops, while also adding new ones. To make resilient adjacency 220 look like resilient adjacency 240, for example, NEXT_HOP_1 would be removed and NEXT_HOP_4 would be added to ROUTE 1's FEC. Here, it would be incorrect for ROUTE 1 to forward data traffic to NEXT_HOP_4, because NEXT_HOP_4 is not a part of adjacency 210 (e.g., in software forwarding table 137).

As shown, NEXT_HOP_1, NEXT_HOP_2, and NEXT_HOP_3 in resilient adjacency 220 for ROUTE 1 may be distributed with a redundancy of 2 (e.g., each entry appears twice) in a table having six entries. NEXT_HOP_2, NEXT_HOP_3, and NEXT_HOP_4 in resilient adjacency 240 for ROUTE 2 may also be distributed with a redundancy of 2 in a table of six entries. Tables of different sizes and different permutations or combinations of the next hops in an FRECMP route may be used.

Figure 3A:
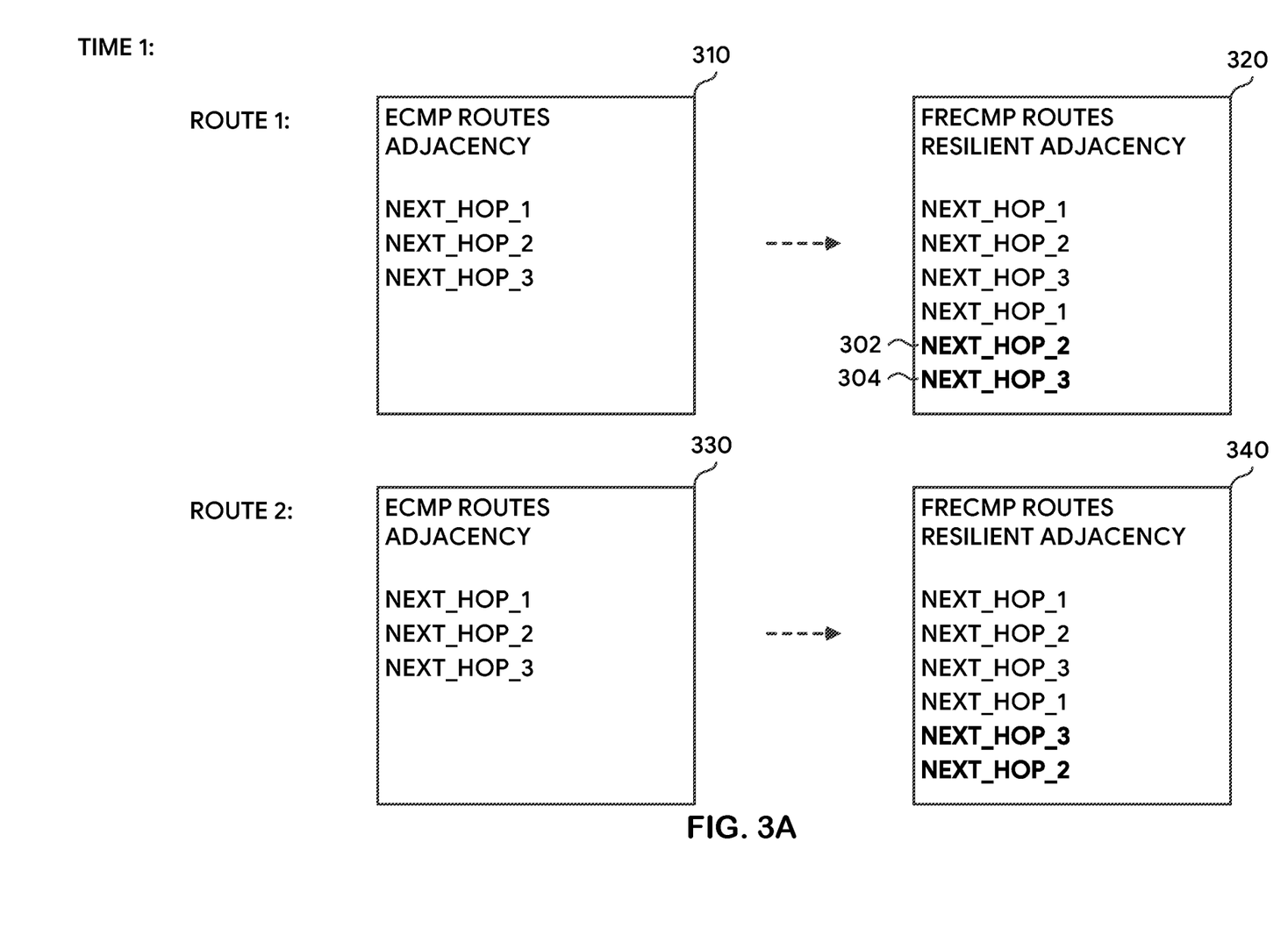
FIG. 3A illustrates further route adjacencies and resilient adjacencies, in accordance with some embodiments of the disclosure.

FIG. 3A illustrates the two routes, ROUTE 1 and ROUTE 2 at time 1, according to various embodiments. Time 1 may occur after time 0. Suppose that by time 1, ROUTE 1 and ROUTE 2 converge to the same set of next hops (e.g., NEXT_HOP_1, NEXT_HOP_2, and NEXT_HOP_3). As shown, ROUTE 1 does not change. For ROUTE 2, adjacency 230 becomes adjacency 330 and resilient adjacency 240 becomes resilient adjacency 340. Even though ROUTE 1 and ROUTE 2 now have the same set of next hops, resilient adjacency 320 for ROUTE 1 and resilient adjacency 340 for ROUTE 2 are different (e.g., the next hops are in a different order). In other words, ROUTE 1 and ROUTE 2 may share an adjacency (e.g., entry in software forwarding table 137, which may be referred to as a software adjacency or software FEC), but may not share a resilient adjacency (e.g., FEC in hardware forwarding table 146 and/or hardware representation138). Suppose further that it would be advantageous for ROUTE 1 and ROUTE 2 to share a FEC object, such as due to resource constraints in hardware forwarding table 146. For example, ROUTE 1 and ROUTE 2 would share a FEC object having resilient adjacency 340.

While the combination of next hops in resilient adjacency 320 and resilient adjacency 340 is the same, they are different permutations. To minimize network traffic flow disruptions, it may be desirable to preserve the order of the next hops as much as possible. Changing the order of next hops may potentially change to which next hop a data packet will be forwarded. In other words, to maintain resiliency as much as possible, the number of changes (e.g., to make resilient adjacency 320 look like resilient adjacency 340, or vice versa) may be minimized. Accordingly, it may not be desirable to reshuffle the order of the next hops. In this way, the history and current state of the FEC objects (before sharing) may be considered.

Figure 3B:
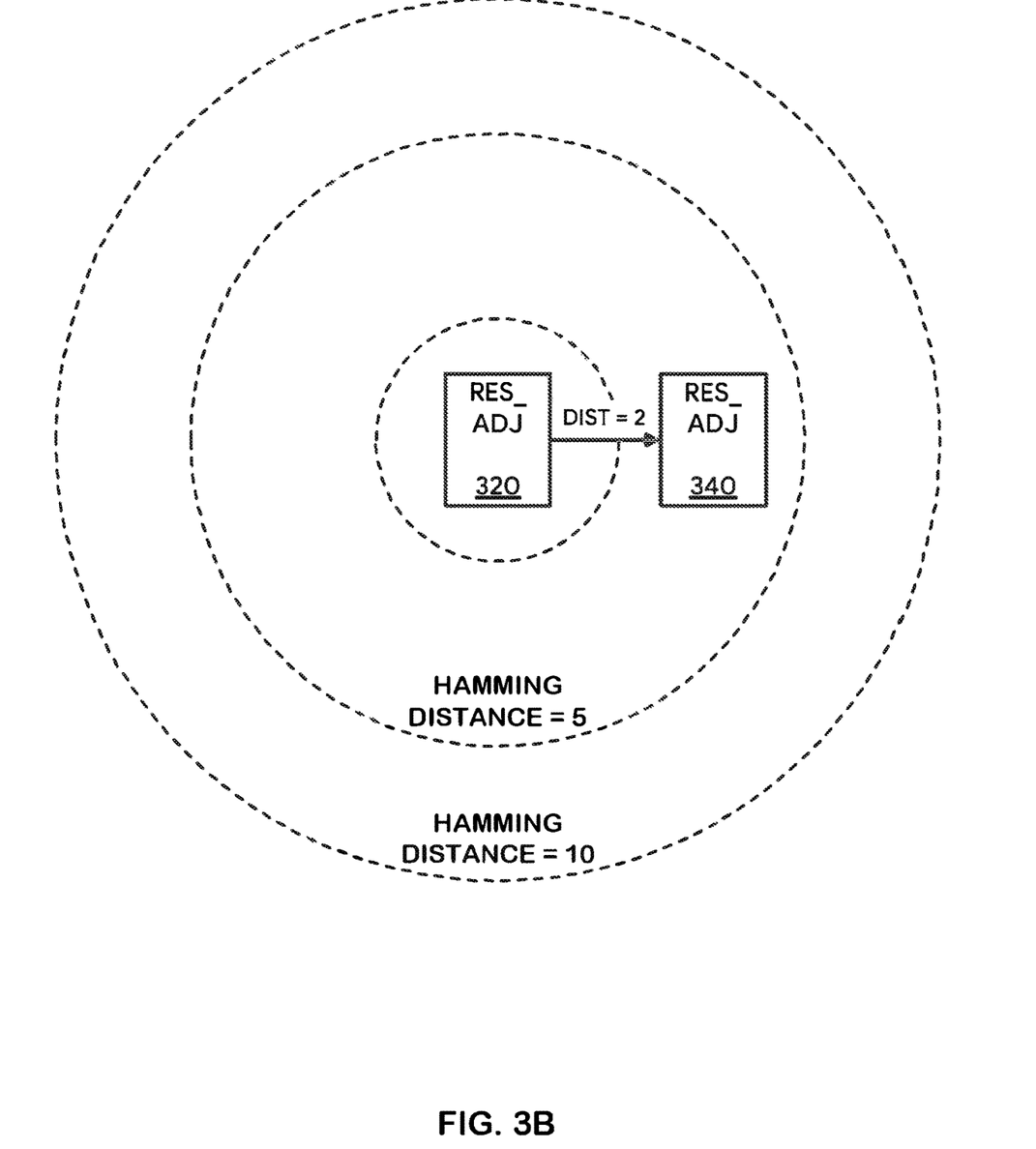
FIG. 3B illustrates a Hamming distance, in accordance with some embodiments of the disclosure.

To minimize the number of changes, the number of changes may be calculated. For example, to make resilient adjacency 320 look like resilient adjacency 340, NEXT_HOP_2 302 would become NEXT_HOP_3 and NEXT_HOP_3 304 would become NEXT_HOP_2. The number of changes needed to change one resilient adjacency into another may be referred to as a Hamming distance. Put another way, the Hamming distance between two resilient adjacencies is the number of positions at which the corresponding next hops are different. The magnitude of the Hamming distance may indicate how disruptive change would be. A smaller Hamming distance may be considered less disruptive than a larger one. FIG. 3B graphically depicts the Hamming distance from resilient adjacency 320 to resilient adjacency 340 is 2.

Sharing Workflow

Figure 4A:
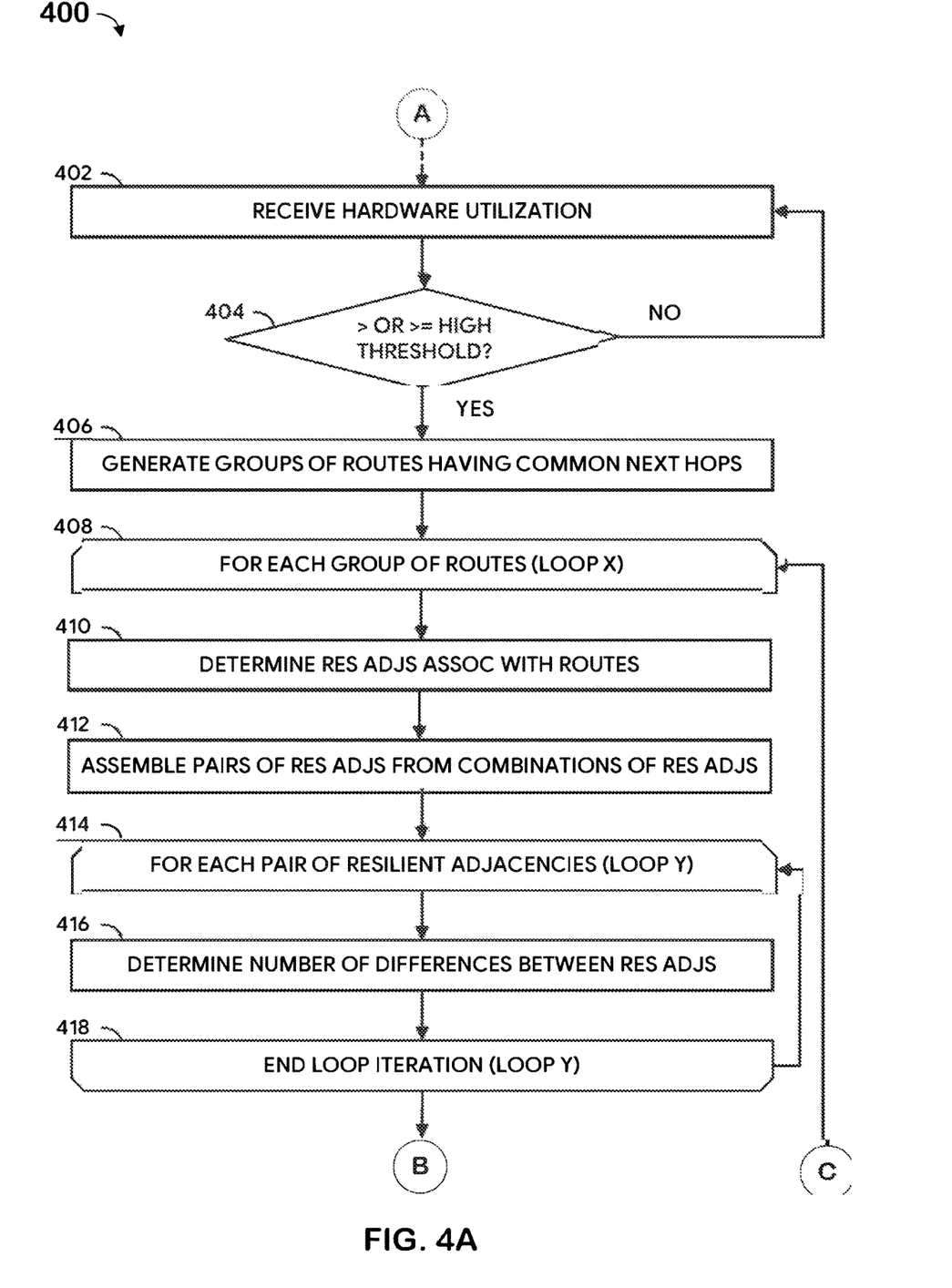
FIGS. 4A and 4B illustrate a flow diagram of a method for sharing hardware forwarding table entries, in accordance with some embodiments of the disclosure.
Figure 4B:
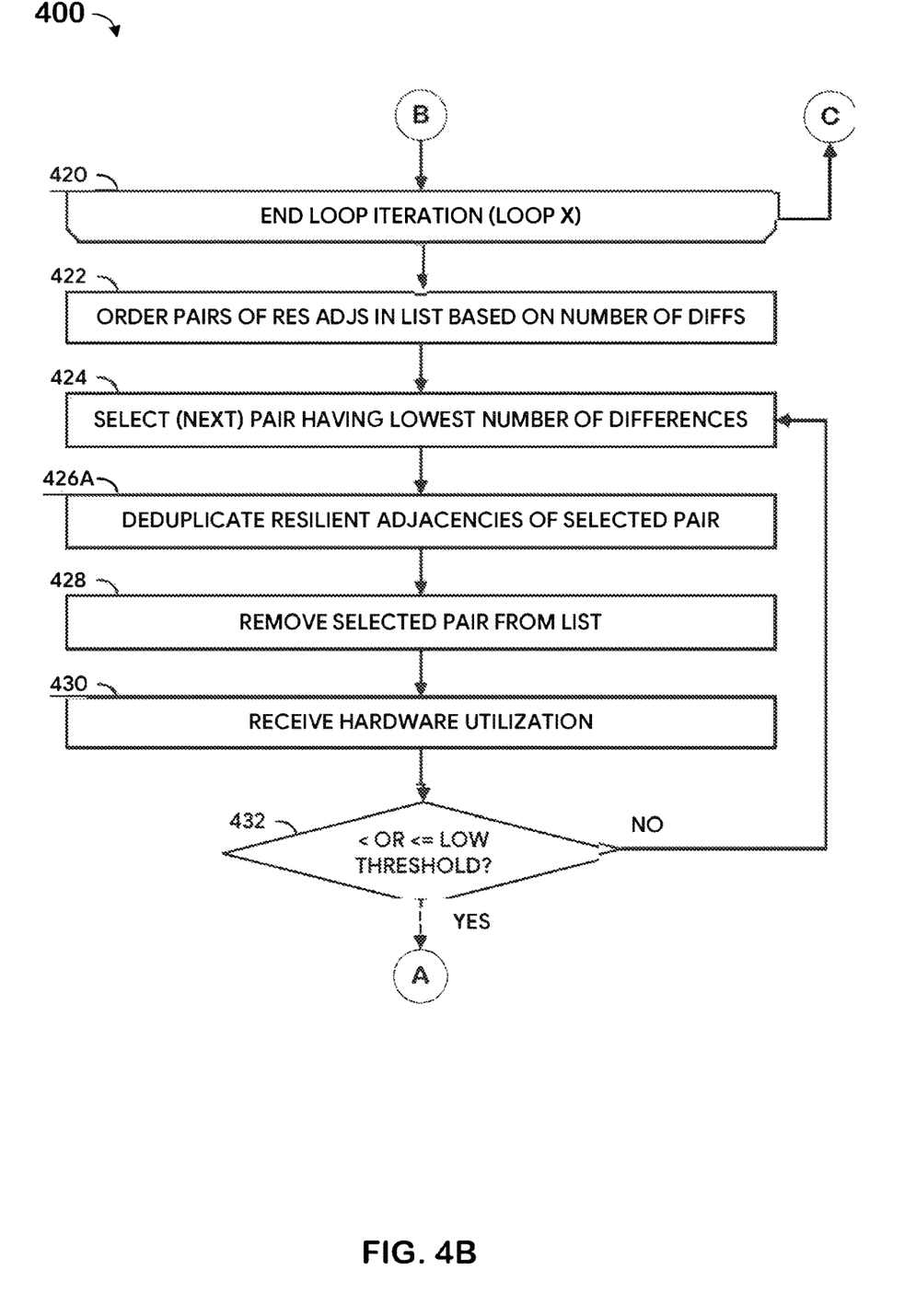

FIGS. 4A and 4B show workflow 400 for sharing hardware forwarding table resources, according to various embodiments. Workflow 400 may be performed by a network device (e.g., CPU 132 (in network device 120) running operating system and/or software 136). Description of workflow 400 will be made with reference to FIGS. 1A, 2, and 3A. The flow of operations performed by the network device is not necessarily limited to the order of operations shown.

Workflow 400 may commence at step 402, where the network device may receive a utilization of hardware forwarding table 146. The utilization may indicate how much of the capacity of hardware forwarding table 146 is used/unused. The utilization may be a percentage, decimal number, on a scale (e.g., 1-10, A-F, etc.), and the like. In the following examples, the utilization indicates the used capacity, but the unused capacity (and appropriate thresholds) may alternatively/additionally be used.

At step 404, the network device may compare the utilization to a high threshold. When the utilization is greater than (or greater than or equal to) the high threshold, workflow 400 may proceed to step 406. When the utilization is less than or equal to (or less than) the low threshold, workflow 400 may return to step 402. The high threshold and/or low threshold may be a predetermined/default value, specified/configured by an administrator/operator of network device 120, and the like. For example, the high threshold may be a percentage in a range from 0%-100%, such as 90%.

At step 406, the network device may put routes that point to the same (or share) an entry in software forwarding table 137 (also referred to as a software adjacency or software FEC) into a group (or grouping). In other words, routes may be put in a group (grouped together) when they share the same (or a common) set of next hops. In the example of FIG. 3A, ROUTE 1 and ROUTE 2 may be grouped together, because adjacency 310 and adjacency 330 are the same software adjacency (e.g., have identical sets of next hops). By way of further non-limiting example, ROUTE 1 and ROUTE 2 in FIG. 2 would not be grouped together, because adjacency 210 and adjacency 230 do not share a software adjacency (e.g., have different sets of next hops).

Alternatively or additionally, routes may be grouped together (e.g., put in a group) when the respective FRECMP routes (resilient adjacencies) have the same number of next hop entries (slots). In FIG. 3A, for example, resilient adjacency 320 and resilient adjacency 340 both have six next hop entries each, so ROUTE 1 and ROUTE 2 may be put together in a group. However, resilient adjacencies may have different numbers of next hop entries. Suppose a route having prefix 10.1.1.0/24 and another route having prefix 11.1.1.0/24 may point to the same software adjacency. Resilient adjacencies covering these prefixes may encapsulate these routes (10.1.0.0/16 and 11.1.0.0/16, respectively) with different capacities and redundancies. By way of non-limiting example, 10.1.0.0/16 may have a capacity of 4 and redundancy of 3, whereas 11.1.0.0/16 may have a capacity of 4 and a redundancy of 4. One resilient adjacency may have 12 next hop slots (e.g., 4×3) while the other may have 16 next hop slots (e.g., 4×4). Routes having different numbers of next hop slots may not be grouped at step 406 and hence not deduplicated (merged).

At step 408, the network device may enter a loop (Loop X) for each group of routes generated at step 406. Within Loop X, the network device may determine the resilient adjacencies corresponding to each route in the group (step 410). For example, the network device may read resilient adjacencies from hardware representation 138.

At step 412, the network device may assemble pairs of resilient adjacencies (from step 410). For example, the network device may create combinations of the resilient adjacencies taken two at a time (e.g., a pair). Here, the order of the resilient adjacencies in the pairs is not distinctive (e.g., resilient adjacency A (A) paired with resilient adjacency B (B) (pair(A, B)) is comparable to B paired with A (pair(B, A))). Referring to FIG. 3A, for example, the pair of resilient adjacency 320 and resilient adjacency 340 may be comparable to the pair of resilient adjacency 340 and resilient adjacency 320. A Hamming distance may be a bidirectional measure, so going from A to B is equivalent to going from B to A.

At step 414, the network device may enter a loop (Loop Y) for each pair of resilient adjacencies assembled at step 412. Within Loop Y, the network device may compare each resilient adjacency to every other resilient adjacency. The number of differences between the resilient adjacencies in each pair is determined. For example, the network device calculates a Hamming distance—a measure of how many next hop slots have to change for one resilient adjacency to match another resilient adjacency— for each pair. Once the network device determines a number of differences for each pair of resilient adjacencies, Loop Y may end (step 418). Once the network device processes each group of routes, Loop X may end (step 420).

At step 422, the network device may order/sort the pairs of resilient adjacencies across all groups of routes, such as in a list/queue. For example, the pairs may be ordered/sorted from smallest Hamming distance to largest Hamming distance. Because a Hamming distance may indicate how disruptive the changes could be, the smaller Hamming distances may be less disruptive and hence advantageous.

Figure 6:
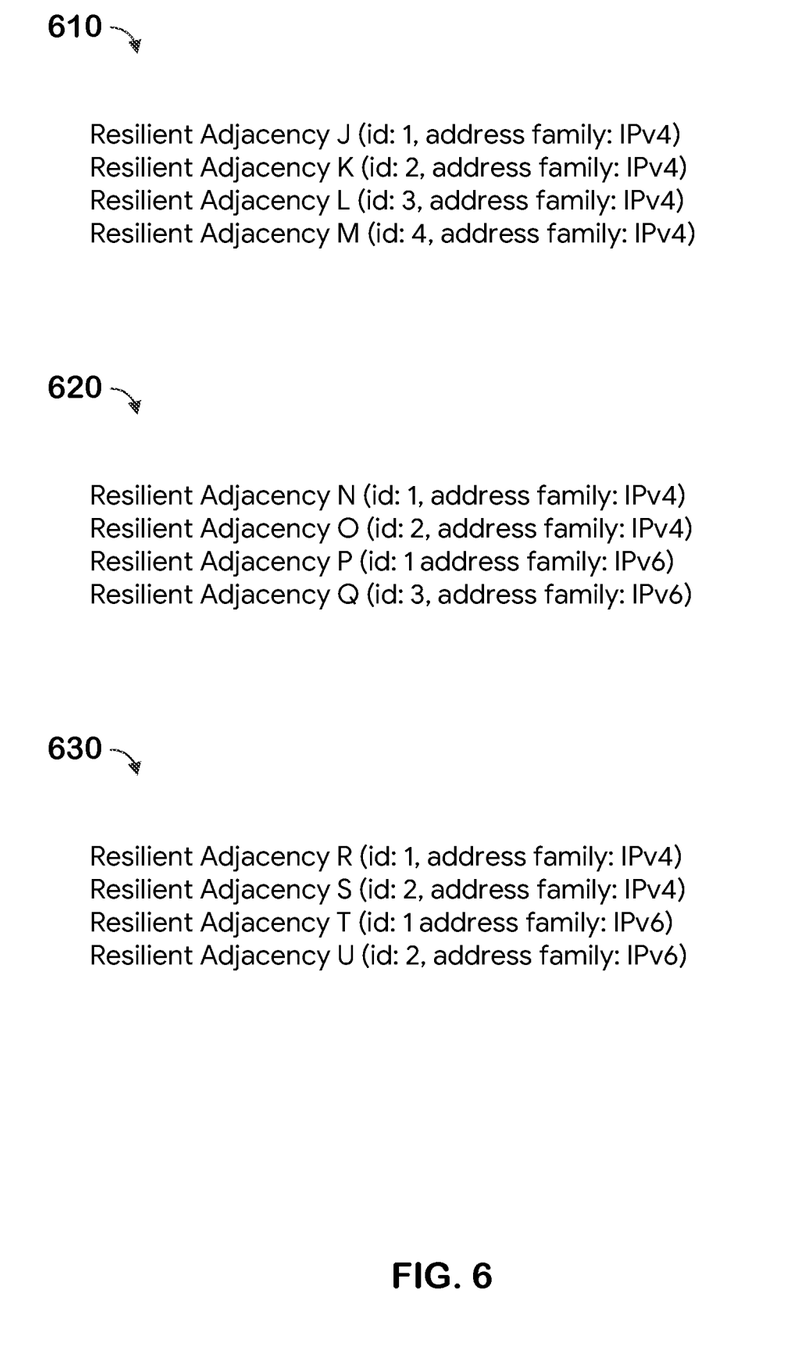
FIG. 6 illustrates example resilient adjacencies according to some embodiments of the disclosure.

FIG. 6 illustrates resilient adjacencies according to some embodiments. In example 610, suppose Resilient Adjacency J (J) and Resilient Adjacency K (K) point to the same FEC (e.g., in software forwarding table 137) and pair (J, K) has a Hamming distance of 1. Suppose further that Resilient Adjacency L (L) and Resilient Adjacency M (M) point to the same FEC (e.g., in software forwarding table 137) and pair (L, M) has a Hamming distance of 2. When ordering/sorting pair (J, K) and pair (L, M), pair (J, K) may be placed ahead of pair (L, M) in the list/queue, because pair (J, K) has a smaller Hamming distance.

Some pairs may have the same Hamming distance (some pairs may tie) and may be further sorted in the list according to additional criteria. By way of example and not limitation, the pairs may be ordered/sorted according to the following characteristics/criteria (in various combinations or permutations and in the following or other order): Hamming distance, source resilient adjacency identification (e.g., a pair having a source resilient adjacency identification that is lower than another pair's source resilient adjacency may be placed/ordered lower in the list), target resilient adjacency identification (e.g., when the source resilient adjacency identifications are the same, a pair having a target resilient adjacency identification that is lower than another pair's target resilient adjacency may be placed/ordered lower in the list), address family (e.g., Internet Protocol version 4 (IPv4) pairs may be placed/ordered ahead of Internet Protocol version 6 (IPv6) pairs in the list/queue), and the like. A resilient adjacency identification may be an identifier for a resilient adjacency. For example, the resilient adjacency identification may be any combination of numbers, letters, and the like, and may be assigned by CPU 132 (e.g., in ascending order) to a resilient adjacency when it is created. A source resilient adjacency (identification) may refer to the first resilient adjacency in the pair and a target resilient adjacency (identification) may refer to the second resilient adjacency in the pair.

In example 610, suppose Resilient Adjacency J (J) and Resilient Adjacency K (K) point to the same FEC (e.g., in software forwarding table 137) and pair (J, K) has a Hamming distance of 1. Suppose further that Resilient Adjacency L (L) and Resilient Adjacency M (M) point to the same FEC (e.g., in software forwarding table 137) and pair (L, M) has a Hamming distance of 1. When ordering/sorting pair (J, K) and pair (L, M), pair (J, K) may be placed ahead of pair (L, M) in the list/queue. Although pair (J, K) and pair (L, M) have the same Hamming distance (1), pair (J, K) has a smaller source resilient adjacency id (id 1) compared to pair (L, M) (id 2).

In example 620, suppose Resilient Adjacency N (N) and Resilient Adjacency O (O) point to the same FEC (e.g., in software forwarding table 137) and pair (N, O) has a Hamming distance of 1. Suppose further that Resilient Adjacency P (P) and Resilient Adjacency Q (Q) point to the same FEC (e.g., in software forwarding table 137) and pair (P, Q) has a Hamming distance of 1. When ordering/sorting pair (N, O) and pair (P, Q), pair (N, O) may be placed ahead of pair (P, Q) in the list/queue. Here, pair (N, O) and pair (P, Q) have the same Hamming distance (1) and source resilient adjacency id (id 1). However, pair (N, O) has a smaller target resilient adjacency id (id 2) than pair (P, Q) (id 3).

In example 630, suppose Resilient Adjacency R (R) and Resilient Adjacency S (S) point to the same FEC (e.g., in software forwarding table 137) and pair (R, S) has a Hamming distance of 1. Suppose further that Resilient Adjacency T (T) and Resilient Adjacency U (U) point to the same FEC (e.g., in software forwarding table 137) and pair (T, U) has a Hamming distance of 1. When ordering/sorting pair (R, S) and pair (T, U), pair (R, S) may be placed ahead of pair (T, U) in the list/queue. Here, pair (R, S) and pair (T, U) have the same Hamming distance (1), source resilient adjacency id (id 1), and same target resilient adjacency id (id 2). However, pair (R,S) is a IPv4 pair and pair (T, U) is a IPv6 pair (and IPv4 pairs may be placed ahead of IPv6 pairs).

Turning back to FIG. 4B, at step 424 the network device may select a pair of resilient adjacencies having a lowest number of differences from the ordered list. For example, the network device may select a pair with the lowest Hamming distance from the beginning of the list.

At step 426A, the network device may deduplicate the resilient adjacencies of the selected pair. Deduplicating the resilient adjacencies is described further in FIG. 5. At step 428, the selected pair is removed from the list.

At step 430, the network device may receive a utilization of hardware forwarding table 146, similar to step 402. At step 432, the network device may compare the utilization to a low threshold. When the utilization is less than (or less than or equal to) the low threshold, workflow 400 may return to step 402. When the utilization is greater than or equal to (or greater than) the low threshold, workflow 400 may return to step 424. The low threshold may be a predetermined/default value, specified/configured by an administrator/operator of network device 120, and the like. For example, the low threshold may be a percentage in a range from 0%-100%, such as 80%.

Workflow 400 may cause traffic flow disruptions, so step 426A (among others) may not be performed all the time. Workflow 400 may selectively perform step 426A. The example of workflow 400 may employ high and low thresholds to determine when to begin and end performing step 426A. In other words, step 426A is performed when resources in hardware forwarding table 146 are running low. The high and low thresholds advantageously create a hysteresis effect, which may further reduce the number of times step 426A is initiated.

Other schemes may be used to control when step 426A (among others) is performed. For example, instead of (or in addition to) evaluating hardware utilization against a threshold (step 404), workflow 400 may begin periodically (e.g., every 500 ms), when then network device detects the amount of data traffic forwarded is below a threshold, when a FEC is about to be created in hardware forwarding table 146, and the like. By way of further non-limiting example, instead of (or in addition to) evaluating hardware utilization against a threshold (step 432), workflow 400 may end after a predetermined number of deduplications (e.g., 10), after there are no more pairs in the list, after all the pairs below (or at or below) a Hamming distance value are deduplicated, and the like.

Figure 5:
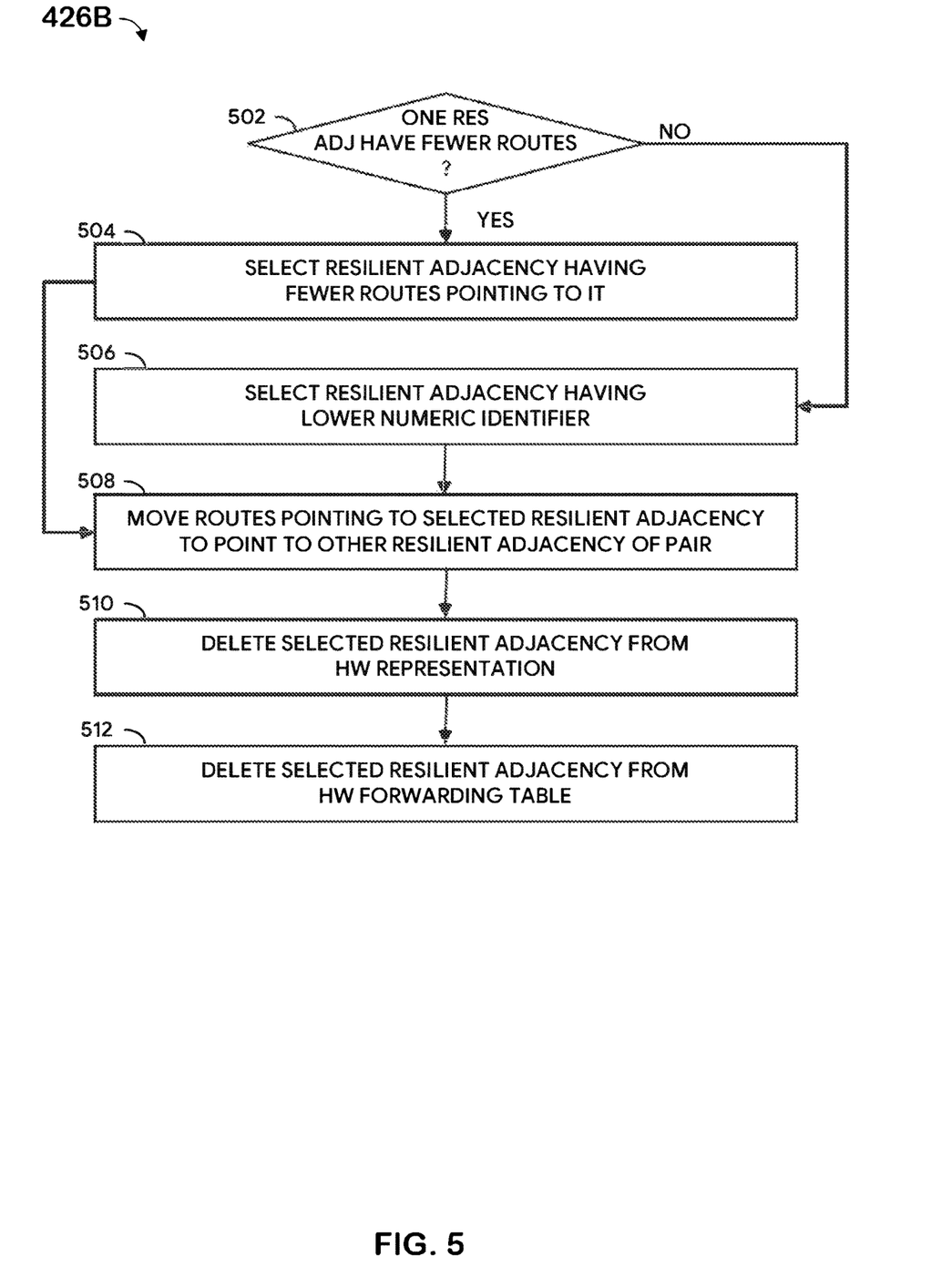
FIG. 5 illustrates a flow diagram of a method for deduplicating hardware forwarding table entries, in accordance with some embodiments of the disclosure.

FIG. 5 illustrates workflow 426B, which is an embodiment of step 426A. Workflow 426B may be performed by a network device (e.g., network device 120). Description of workflow 426B will be made with reference to FIG. 1A. The flow of operations performed by the network device is not necessarily limited to the order of operations shown.

Workflow 426B may commence at step 502, where the network device may evaluate the resilient adjacencies in the pair selected at step 424. For example, suppose pair (A, B) is selected. Pair (A, B) may be the pair of resilient adjacency 320 and resilient adjacency 340. When one of A or B has more/fewer routes referring/pointing to it, then workflow 426B may proceed to step 504. When one of A or B does not have more/fewer routes referring/pointing to it (e.g., the two resilient adjacencies each have the same number of routes referring/pointing to it), then workflow 426B may proceed to step 506.

At step 504, the network device may select the resilient adjacency having fewer routes referring/pointing to it. In this way, the resilient adjacency between A and B having a larger number of routes pointing/referring to it may be preserved and the other resilient adjacency in the pair may be deleted. This selection may advantageously limit network traffic disruptions.

At step 506, the network device may select the resilient adjacency having a lower resilient adjacency identification.

At step 508, the network device may move (reprogram) the routes from pointing/referring to the selected resilient adjacency to pointing to the other resilient adjacency in the pair. For example, network device may update software forwarding table 137 with this change. At step 510, the network device may remove the selected resilient adjacency from hardware representation 138. At step 512, the network device may remove selected resilient adjacency from hardware forwarding table 146. For example, CPU 132 may instruct hardware forwarding table 146 to delete a FEC corresponding to the selected resilient adjacency (e.g., after it is deduplicated).

Network Device

FIG. 7 depicts an example of a network device 700 in accordance with some embodiments of the present disclosure. In some embodiments, network device 700 can be a switch. As shown, network device 700 includes a management module 702, an internal fabric module 704, and a number of I/O modules 706a-706p. Management module 702 includes the control plane (also referred to as control layer or simply the CPU) of network device 700 and can include one or more management CPUs 708 for managing and controlling operation of network device 700 in accordance with the present disclosure. Each management CPU 708 can be a general-purpose processor, such as an Intel®/AMD® x86 or ARM® microprocessor, that operates under the control of software stored in a memory, such as random access memory (RAM) 726. Control plane refers to all the functions and processes that determine which path to use, such as routing protocols, spanning tree, and the like.

Internal fabric module 704 and I/O modules 706a-706p collectively represent the data plane of network device 700 (also referred to as data layer, forwarding plane, etc.). Internal fabric module 704 is configured to interconnect the various other modules of network device 700. Each I/O module 706a-706p includes one or more input/output ports 710a-710p that are used by network device 700 to send and receive network packets. Input/output ports 710a-710p are also known as ingress/egress ports. Each I/O module 706a-706p can also include a packet processor 712a-712p. Each packet processor 712a-712p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Management module 702 includes one or more management CPUs 708 that communicate with storage subsystem 720 via bus subsystem 730. Other subsystems, such as a network interface subsystem (not shown in FIG. 7), may be on bus subsystem 730. Storage subsystem 720 includes memory subsystem 722 and file/disk storage subsystem 728 represent non-transitory computer-readable storage media that can store program code and/or data, which when executed by one or more management CPUs 708, can cause one or more management CPUs 708 to perform operations in accordance with embodiments of the present disclosure.

Memory subsystem 722 includes a number of memories including main RAM 726 for storage of instructions and data during program execution and read-only memory (ROM) 724 in which fixed instructions are stored. File storage subsystem 728 can provide persistent (i.e., non-volatile) storage for program and data files, and can include a magnetic or solid-state hard disk drive, and/or other types of storage media known in the art.

One or more management CPUs 708 can run a network operating system stored in storage subsystem 720. A network operating system is a specialized operating system for network device 700 (e.g., a router, switch, firewall, and the like). For example, the network operating system may be Arista Extensible Operating System (EOS), which is a fully programmable and highly modular, Linux-based network operating system. Other network operating systems may be used.

Bus subsystem 730 can provide a mechanism for letting the various components and subsystems of management module 702 communicate with each other as intended. Although bus subsystem 730 is shown schematically as a single bus, alternative embodiments of the bus subsystem can utilize multiple busses.

What is claimed is:

1. A method comprising:
A) identifying a plurality of groups, each group comprising routes that are associated with a same set of next hops;
B) for each group, pairing sets of resilient adjacencies corresponding to the routes in the group to produce pairs of resilient adjacencies for the group;
C) identifying a pair of resilient adjacencies from among a plurality of pairs of resilient adjacencies across all the groups;
D) selecting a first resilient adjacency from the identified pair;
E) programming one or more routes in a forwarding table that refer to the first resilient adjacency in the identified pair to refer to a second resilient adjacency in the identified pair; and
F) removing the first resilient adjacency from a hardware table that stores the first resilient adjacency.

2. The method of claim 1, wherein the set of next hops associated with each route in a given group comprises the same next hops but in different order.

3. The method of claim 1, wherein identifying the pair of resilient adjacencies among the plurality of pairs of resilient adjacencies across all the groups is based on a number of differences between the resilient adjacencies in each pair of resilient adjacencies.

4. The method of claim 3, wherein the identified pair of resilient adjacencies has a lowest number of differences.

5. The method of claim 3, wherein the identified pair of resilient adjacencies has a number of differences that is less than a threshold value.

6. The method of claim 3, wherein the differences are Hamming distances.

7. The method of claim 1, wherein the first resilient adjacency has fewer routes pointing to it than the second resilient adjacency.

8. The method of claim 1, wherein the routes are flow resilient equal-cost multi-path (FRECMP) routes.

9. The method of claim 1, wherein the steps A-F are performed periodically at a predetermined rate.

10. The method of claim 1, further comprising:
determining a hardware utilization; and
comparing the hardware utilization to a utilization threshold,
wherein the method is performed when the hardware utilization is greater than or equal to the utilization threshold.

11. A network device comprising:
at least one processor; and
a memory communicatively coupled to the at least one processor, the memory storing instructions executable by the at least one processor to perform a method, the method comprising:
A) identifying a plurality of groups, each group comprising routes that are associated with a same set of next hops;
B) for each group, pairing sets of resilient adjacencies corresponding to the routes in the group to produce pairs of resilient adjacencies for the group;
C) identifying a pair of resilient adjacencies from among a plurality of pairs of resilient adjacencies across all the groups;
D) selecting a first resilient adjacency from the identified pair;
E) programming one or more routes in a forwarding table that refer to the first resilient adjacency in the identified pair to refer to a second resilient adjacency in the identified pair; and
F) removing the first resilient adjacency from a hardware table that stores the first resilient adjacency.

12. The network device of claim 11, wherein the set of next hops associated with each route in a given group comprises the same next hops but in different order.

13. The network device of claim 11, wherein identifying the pair of resilient adjacencies among the plurality of pairs of resilient adjacencies across all the groups is based on a number of differences between the resilient adjacencies in each pair of resilient adjacencies.

14. The network device of claim 11, wherein first resilient adjacency has fewer routes pointing to it than the second resilient adjacency.

15. The network device of claim 11, wherein the steps A-F are performed periodically at a predetermined rate.

16. A non-transitory computer-readable storage medium having embodied thereon a program executable by a processor to perform a method, the method comprising:
A) identifying a plurality of groups, each group comprising routes that are associated with a same set of next hops;
B) for each group, pairing sets of resilient adjacencies corresponding to the routes in the group to produce pairs of resilient adjacencies for the group;
C) identifying a pair of resilient adjacencies from among a plurality of pairs of resilient adjacencies across all the groups;
D) selecting a first resilient adjacency from the identified pair;
E) programming one or more routes in a forwarding table that refer to the first resilient adjacency to refer to a second resilient adjacency; and
F) removing the first resilient adjacency from a hardware table that stores the first resilient adjacency.

17. The non-transitory computer-readable storage medium of claim 16, wherein the set of next hops associated with each route in a given group comprises the same next hops but in different order.

18. The non-transitory computer-readable storage medium of claim 16, wherein identifying the pair of resilient adjacencies among the plurality of pairs of resilient adjacencies across all the groups is based on a number of differences between the resilient adjacencies in each pair of resilient adjacencies.

19. The non-transitory computer-readable storage medium of claim 16, wherein first resilient adjacency has fewer routes pointing to it than the second resilient adjacency.

20. The non-transitory computer-readable storage medium of claim 16, wherein the method further comprises:
   determining a hardware utilization; and
   comparing the hardware utilization to a utilization threshold,
   wherein the method is performed when the hardware utilization is greater than or equal to the utilization threshold.

\* \* \* \* \*